Feb. 8, 1938.　　　　G. A. GEMMER　　　2,107,606
MOTOR VEHICLE CONSTRUCTION
Filed June 12, 1936　　　2 Sheets-Sheet 1

Inventor
George A. Gemmer
By
Attorney

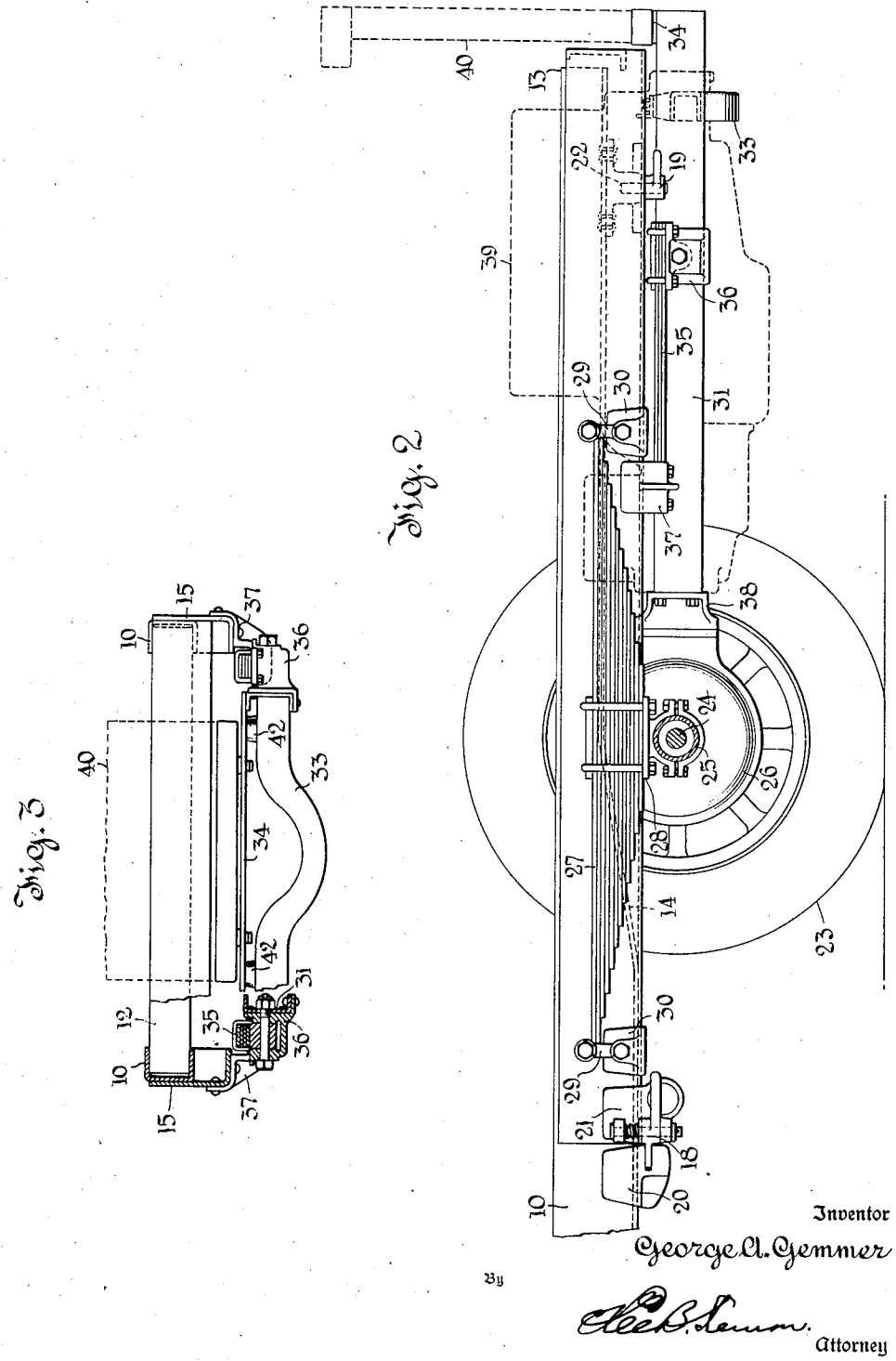

Patented Feb. 8, 1938

2,107,606

UNITED STATES PATENT OFFICE 2,107,606

MOTOR VEHICLE CONSTRUCTION

George A. Gemmer, Richmond, Ind.

Application June 12, 1936, Serial No. 84,931

6 Claims. (Cl. 180—57)

This invention relates, in general, to improvements in mountings for motor vehicle propelling assemblies, and more particularly to a vehicle construction having a detachable propelling assembly disposed at the rear of the vehicle.

It is an object of this invention to provide an improved mounting which permits easy and quick disconnection and removal of a complete propelling assembly from a motor vehicle.

It is another object of the invention to provide a propelling assembly for vehicles which may be connected to or separated from the vehicle by simple manipulation of a small number of conveniently located clamps, the detachable assembly including a resiliently mounted motor, gears, axle and wheels, as well as the rear springs of the vehicle.

It is another object of the invention to provide a quickly detachable propelling assembly for vehicles, wherein the driving motor is both pivotally and resiliently supported with respect to the vehicle frame to permit the use of standard units but without the usual drive shaft and universal joint.

It is another object of the invention to provide a detachable propelling assembly for vehicles, the unit having the motor so sprung as to minimize the transmission of road shocks and motor vibration to the vehicle.

Other objects and advantages of the invention will become apparent from the following detailed description of the embodiment of the invention shown in the accompanying drawings, wherein:

Figure 2 is an elevation view, partly in section, of the construction shown in Figure 1.

Figure 3 is an elevation view partly in section of the connection between the sub-frame and the motor support hereinafter described.

Figure 1:
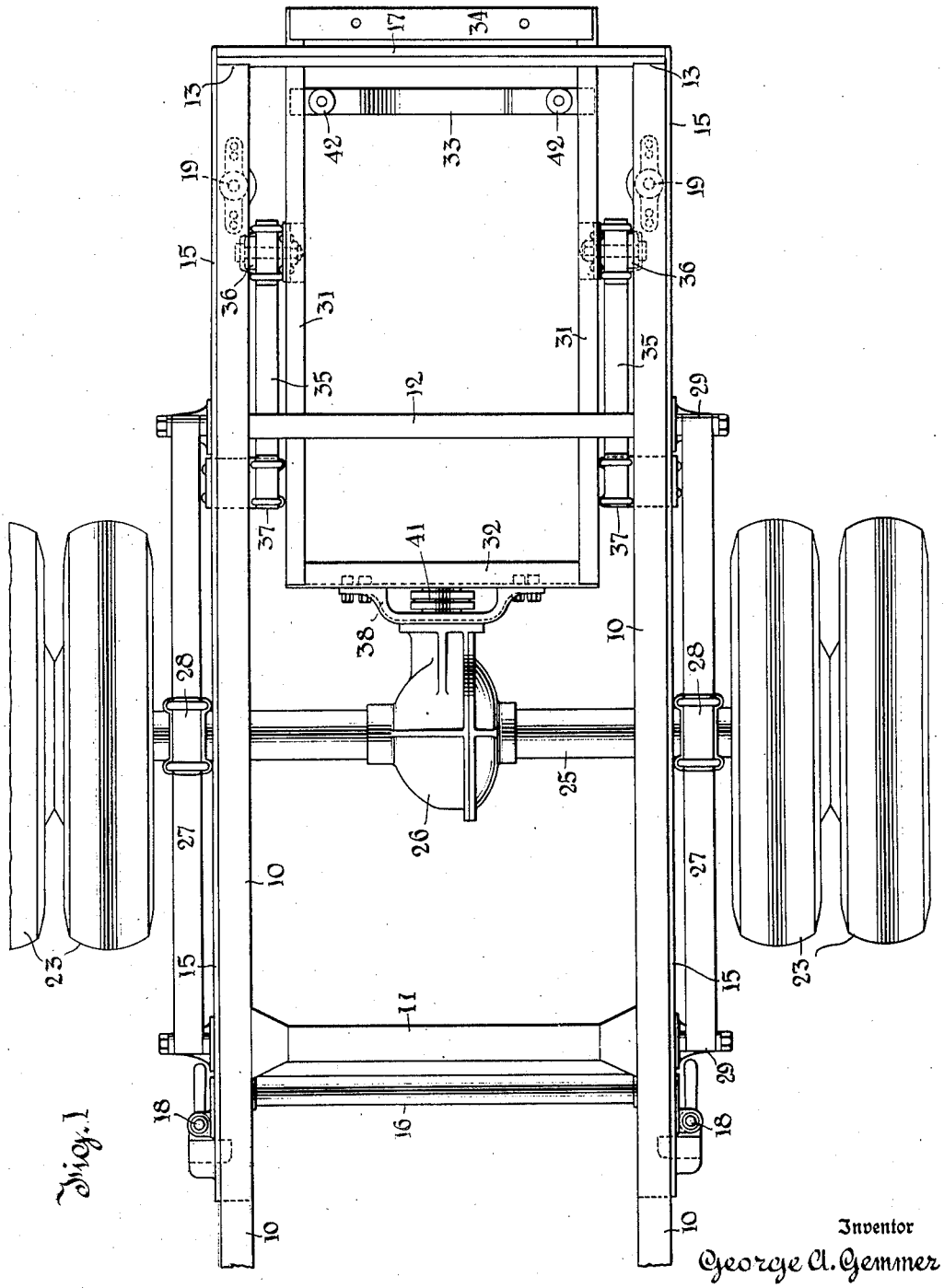
Figure 1 is a plan view of the rear portion of a motor vehicle chassis provided with a removable propelling assembly.

Referring to the drawings, for the purpose of illustrating an embodiment of the invention, the channel side members of a conventional vehicle chassis frame are indicated by the numeral 10. Only the rear portions of the main frame members 10 are illustrated, it being obvious that the members 10 may extend to the front of the vehicle chassis and that the vehicle body may be supported on and secured to said main frame. The rear portions of members 10 may be connected to each other by suitable cross members 11 and 12 as well known. The members 10 may extend to the point indicated by the numeral 13 at the rear of the vehicle chassis and may be of reduced depth as shown at 14 in Figure 2.

A sub-frame for the propelling assembly comprises side members 15 and cross members 16 and 17 and conforms with and engages the under and outer sides of the main frame members 10.

A pair of clamps 18 is provided at the forward end of the propelling assembly sub-frame to secure the latter to the main frame 10. A second pair of clamps 19 is provided near the rear of the sub-frame for further securing the sub-frame to the frame members 10.

The clamps 18 may be of known quick-acting cam type comprising a bracket 21 secured to the sub-frame 15, a slotted bracket 20 secured to the main frame 10, and a cam pivotally supported in the bracket 21 and adapted to engage the slot in bracket 20 to clamp the sub-frame to the main frame. The brackets 21 may be provided with suitable sockets for holding the ends of the sub-frame cross member 16. The clamps 19 adjacent the rear of the main frame may also be of the quick detachable type like those shown at 18, or may comprise a bracket and stud 22 attached at either side of the frame to the members 10, the stud being provided with a wing nut or the like for drawing the sub-frame member 15 into locked engagement with the main frame 10, as illustrated.

The rear vehicle wheels are indicated by the numeral 23 and are secured to axles 24 journaled in the housing 25. A conventional differential gear 26 is provided in the rear axle housing 25. Semi-elliptic springs 27 are secured to the axle housing 25 by hangers 28 and have their ends secured to the sub-frame members 15 by suitable shackles 29 and brackets 30 for resiliently supporting the main vehicle frame and the body carried thereon.

Support for the vehicle driving motor unit 39 including a clutch and transmission is provided by members 31 connected by cross members 32, 33 and 34. Engine supporting springs 35 may extend longitudinally of the vehicle frame and between the members 31 and the sub-frame 15. Springs 35 have one end rigidly secured to the sub-frame member 15 by the brackets 37, the other end of the springs being pivotally connected to the motor support members 31 by the brackets 36 as shown in Figure 3. The forward cross member 32 of the motor support is rigidly secured to the differential and axle housing 25—26 by means of the coupling member 38. The motor, clutch, and transmission unit 39 may be secured at one end to engine lugs 42 on the cross member 33 and fastened at the other end to the cross member 32 and coupling bracket 38. A suitable flexible coupling 41 is utilized to connect the transmission drive shaft to the differential gear mechanism in order to allow for possible misalignment of the transmission and engine with respect to the differential. A conventional radiator 40 may be supported on the cross member 34 of the motor support. Fuel tanks, batteries and other auxiliaries may also be secured to the sub-frame 15.

The use of the pivots for the motor support permits the members 31 to be rigidly connected to the differential housing 26 through cross member 32 and bracket 38, the motor and its support thereby being free to oscillate on a horizontal axis through the pivots, as the vehicle wheels are deflected by road inequalities. This pivotal mounting permits the elimination of universal joints ordinarily used to allow movement of the axle housing with respect to the driving motor and allows the use of standard transmission and engine parts as well as a standard differential and housing.

It will be apparent from the above description that the entire vehicle propelling assembly comprising the driven wheels 23, springs 27, clutch, transmission and motor 39, and associated parts may be easily disconnected and removed from the main vehicle frame 10. All of the parts making up the driving assembly are attached to the detachable sub-frame 15 which permits removal of the complete propelling assembly for repairs whenever necessary, and in a minimum amount of time. It is only required to disconnect the motor and brake controls, support the vehicle, release clamps 18 and 19, and roll the propelling assembly from under the vehicle, in order to secure easy access to the entire driving mechanism. The vehicle may be returned to service at once by attaching another propelling assembly already in good repair thereto.

It will also be apparent from the above description that the motor or engine unit 39 is resiliently and pivotally supported or sprung with respect to the vehicle frame 10 and consequently the vehicle is practically free from engine vibration. The engine supports 31 are connected to the sub-frame 15 only through springs 35, and indirectly through the vehicle springs 27 thereby minimizing the transmission of engine vibrations to the sub-frame and vehicle frame.

The described construction also gives the advantage of providing maximum space for the vehicle body by reason of the engine being at the rear and close to the driven wheels. The engine is supported in a relatively low position which well adapts it for use in connection with passenger buses, wherein a low floor and maximum passenger space are desirable.

It will be understood that the foregoing description is illustrative, and that the appended claims are intended to cover such other embodiments as are within the scope of the invention.

What I claim is:

1. In a motor vehicle provided with a body supporting frame, a readily detachable propelling assembly positioned adjacent the rear of said vehicle frame, said assembly comprising, driving wheels and axles therefor, a housing for said axles, a sub-frame and resilient supporting means arranged between said sub-frame and said housing, means for detachably securing said sub-frame to said vehicle frame, and a motor unit extending rearward of and rigidly connected to said housing for driving said vehicle, pivot means secured to said motor unit at a point intermediate the ends thereof, and resilient means secured at one end to said sub-frame and extending rearwardly to said pivot means for supporting as sprung weight a desired portion of the weight of said unit.

2. In a motor vehicle provided with a body supporting frame, a readily detachable propelling assembly positioned adjacent the rear of said vehicle frame, said assembly comprising, driving wheels and axles therefor, a housing for said axles, a rigid sub-frame conforming to the rear portion of said vehicle frame and resilient supporting means arranged between said sub-frame and said housing, means for detachably securing said sub-frame to said vehicle frame, and a motor unit extending rearward of and rigidly connected to said housing for driving said vehicle, pivot means secured to said motor unit at a point intermediate the ends thereof, and resilient means secured at one end to said sub-frame and extending rearwardly to said pivot means for supporting as sprung weight a desired portion of the weight of said unit.

3. In a motor vehicle provided with a body supporting frame, a readily detachable propelling assembly positioned adjacent the rear of said vehicle frame, said assembly comprising, driving wheels and axles therefor, a housing for said axles, a sub-frame and resilient supporting means arranged between said sub-frame and said housing, means for removably securing said sub-frame to said vehicle frame, a motor support extending rearwardly of and rigidly connected to said housing, and a motor unit carried by said support and having a driving connection to said axles for driving said wheels, pivot means secured to said motor support at a point intermediate the ends thereof, and resilient means secured at one end to said sub-frame and extending rearwardly to said pivot means for supporting as sprung weight a desired portion of the weight of said support and said unit.

4. In a motor vehicle, a propelling assembly comprising a frame adapted to be detachably secured to the rear portion of the vehicle body supporting frame, wheels and axles associated with said first mentioned frame, a differential gear connecting said axles, a housing for said gear, a motor unit support rigidly connected to said gear housing, and a pivotal connection between said support and the frame of said assembly, said connection including resilient means secured at one end to said first-mentioned frame and extending rearwardly to pivot means secured to said support intermediate the ends of said support.

5. In a motor vehicle, a propelling assembly comprising a frame adapted to be detachably secured to the rear portion of a vehicle body supporting frame, wheels and axles associated with said first-mentioned frame, a housing for said axles, a motor unit support rigidly connected to said housing for movement therewith, resilient supporting means for said unit secured to said frame and to pivotal means on said motor unit support intermediate the ends of said support.

6. In a motor vehicle provided with a frame, a propelling assembly positioned adjacent the rear of said vehicle frame, said assembly comprising, driving wheels and axles therefor, a housing for said axles, resilient means extending between said housing and said frame, an internal combustion engine unit extending rearward of and rigidly connected to said housing for driving said vehicle, pivot means secured to said engine unit at a point intermediate the ends thereof, and resilient means rigidly secured at one end to said vehicle frame and extending rearwardly to said pivot means for supporting as sprung weight a desired portion of the weight of said unit.

GEORGE A. GEMMER.